US010934994B2

(12) United States Patent
Senthoorpandian et al.

(10) Patent No.: US 10,934,994 B2
(45) Date of Patent: Mar. 2, 2021

(54) METHOD AND SYSTEM FOR DE-ERECTION AND RE-ERECTION OF A BLADE OF A WIND TURBINE

(71) Applicant: WINDCARE INDIA PVT LTD, Tirpur (IN)

(72) Inventors: Anthonyraj Prem Kumar Senthoorpandian, Tirpur (IN); Kalimuthu Nagrathinam, Tirpur (IN)

(73) Assignee: WINDCARE INDIA PVT LTD, Tirupur (IN)

( * ) Notice: Subject to any disclaimer, the term of this patent is extended or adjusted under 35 U.S.C. 154(b) by 369 days.

(21) Appl. No.: 15/307,031

(22) PCT Filed: Apr. 30, 2015

(86) PCT No.: PCT/IB2015/053136
§ 371 (c)(1),
(2) Date: Oct. 27, 2016

(87) PCT Pub. No.: WO2015/166439
PCT Pub. Date: Nov. 5, 2015

(65) Prior Publication Data
US 2017/0045029 A1    Feb. 16, 2017

(30) Foreign Application Priority Data
Apr. 30, 2014   (IN) ............................ 2187/CHE/2014

(51) Int. Cl.
*F03D 1/06* (2006.01)
*F03D 13/10* (2016.01)
*F03D 80/50* (2016.01)

(52) U.S. Cl.
CPC ........... *F03D 1/0675* (2013.01); *F03D 13/10* (2016.05); *F03D 80/50* (2016.05);
(Continued)

(58) Field of Classification Search
CPC ........ F03D 1/0675; F03D 80/50; F03D 13/10; F05B 2230/70; F05B 2230/60; F05B 2230/61
See application file for complete search history.

(56) References Cited

U.S. PATENT DOCUMENTS

| 7,670,090 B1* | 3/2010 | Landrum | B60P 3/40 410/44 |
| 2010/0139062 A1* | 6/2010 | Reed | F03D 13/10 29/23.51 |

(Continued)

FOREIGN PATENT DOCUMENTS

| WO | WO-2008/132226 A1 | 11/2008 |
| WO | WO-2011/035167 A1 | 3/2011 |

(Continued)

OTHER PUBLICATIONS

International Search Report issued by the Indian Patent Office in relation to International Application No. PCT/IB2015/053136 dated Aug. 31, 2015 (3 pages).

(Continued)

*Primary Examiner* — Moshe Wilensky
(74) *Attorney, Agent, or Firm* — Robert P. Michal, Esq.; Carter, DeLuca & Farrell LLP

(57) ABSTRACT

A system for de-erection and re-erection of a blade of a wind turbine, the system comprising at least one first pulley, at least one second pulley, at least one third pulley, a receptacle disposed over a substantial length of the blade, a lifting line passing over the at least one first pulley, the at least one second pulley, the at least one third pulley and attached back to the at least one second pulley, at least one load bearing mechanism configured for pulling and releasing of the lifting line to enable vertical motion of the receptacle disposed over the blade, a load supporting mechanism connected to an operative bottom portion of the blade and configured to (Continued)

support the blade during de-erection and re-erection thereof and at least one holding mechanism attached to the at least one third pulley, the at least one holding mechanism adapted to hold the receptacle.

11 Claims, 4 Drawing Sheets

(52) U.S. Cl.
CPC ....... *F05B 2230/60* (2013.01); *F05B 2230/61* (2013.01); *F05B 2230/70* (2013.01); *Y02E 10/72* (2013.01); *Y02P 70/50* (2015.11)

(56) References Cited

U.S. PATENT DOCUMENTS

| | | | | |
|---|---|---|---|---|
| 2012/0192400 | A1* | 8/2012 | Malaschewski | E04G 3/30 29/428 |
| 2014/0318033 | A1 | 10/2014 | Coordes | |
| 2015/0232307 | A1* | 8/2015 | Holloway | B66C 1/108 414/800 |
| 2016/0146194 | A1* | 5/2016 | Christiansen | F03D 17/00 73/788 |
| 2016/0273515 | A1* | 9/2016 | Bueno De Santiago | B66C 23/185 |

FOREIGN PATENT DOCUMENTS

| WO | WO-2011/161740 A1 | 12/2011 |
|---|---|---|
| WO | WO-2012/065613 A1 | 5/2012 |

OTHER PUBLICATIONS

Written Opinion of the International Searching Authority issued by the Indian Patent Office in relation to PCT/IB2015/053136 dated Aug. 31, 2015 (6 pages).

* cited by examiner

METHOD AND SYSTEM FOR DE-ERECTION AND RE-ERECTION OF A BLADE OF A WIND TURBINE

CROSS-REFERENCE TO RELATED APPLICATIONS

This application is a National Phase Entry under 35 USC § 371 of PCT Patent Application Serial No. PCT/IB2015/053136 filed Apr. 30, 2015, which claims the benefit under 35 USC § 119 to Indian Patent Application No. 2187/CHE/2014, filed Apr. 30, 2014, the disclosure of each of these applications are expressly incorporated herein by reference in their entireties.

FIELD OF THE DISCLOSURE

The present disclosure relates to the field of blade de-erection and re-erection of a wind turbine.

BACKGROUND

A wind turbine is a device used to convert the wind energy into electrical energy by the rotary motion of its blades. One of the key challenges to the construction and operation of the wind turbine is the de-erection and re-erection of its blades. During regular use, the turbine blades are subjected to failure and other form of damages caused by natural reasons such as lightning and birds and mass particles hitting the blade. The conventional methods of de-erecting and re-erecting the turbine blades make extensive use of the crane. Some of the disadvantages associated with this conventional method include the requirement of large capacity cranes and requirement to mobilize them, the requirement of large amount of fuel to operate the crane, large trucks to transport the crane parts and inaccessibility for the cranes when wind turbines are located on uneven terrains. A number of prior arts have attempted to resolve the above mentioned problems.

For example, PCT publication No. WO2011/095167 discloses a method and a system to hoist or lower the blades of a wind turbine. Hoisting equipment is arranged within a wind turbine hub with the help of a wind turbine service crane, typically located in a nacelle. The hoisting equipment includes a carrier member with a root winch and a tip winch mounted on a bearing plate. The root winch and the tip winch facilitate the mounting of a root wire and a tip wire respectively. A sling is attached to the tip of the blade with the help of a tip wire. By relatively moving the tip wire and the root wire, the blade is lowered to the ground. While the aforementioned patent document provides a crane less solution for hoisting or lowering of the blades, the system still lacks an effective harness to hold the blade.

PCT publication No. WO2012/065613 discloses a method for crane less wind turbine blade handling via a turbine hub. The blade to be dismounted is positioned in a vertical position pointing towards the ground. A lifting yoke is used for lowering the blade for maintenance or repair. A wire, chain or any other known means, applies the force required for lowering the blade. A wire is connected to the lifting yoke that is introduced into the hub by at least one pulley. The wire is introduced into the hub via a receiving portion located on the concave part of the hub. A nacelle winch or a ground-based winch operates the wire. The blades are moved to or from the intermediate position by actuators operated pneumatically, hydraulically, or electrically. While the aforementioned patent document discloses the use of lifting straps for covering the blade, it fails to provide any details on its design. Faulty design of the straps leads to the blade slipping and falling to the ground, thereby causing damages.

Hence there is a need for a system and a method that alleviates the drawbacks associated with conventional methods and systems for de-erecting and re-erecting of a blade of a wind turbine.

OBJECTS

Some of the objects of the system and the method of the present disclosure, which at least one embodiment herein satisfies, are as follows:

An object of the present disclosure is to provide a system and method for de-erection and re-erection of a blade of a wind turbine which effectively minimizes the use of a crane.

Another object of the present disclosure is to provide a system and method for de-erection and re-erection of a blade of a wind turbine which works for KW to MW class wind turbines.

Yet another object of the present disclosure is to provide a system and method for de-erection and re-erection of a blade of a wind turbine which can perform the operation at greater heights.

A further object of the present disclosure is to provide a system and method for de-erection and re-erection of a blade of a wind turbine which is portable.

Yet another object of the present disclosure is to provide a system and method for de-erection and re-erection of a blade of a wind turbine which is cost effective.

Another object of the present disclosure is to provide a system and method for de-erection and re-erection of a blade of a wind turbine which can be used on different terrains.

Still another object of the present disclosure is to provide a system and method for de-erection and re-erection of a blade of a wind turbine which is time effective.

Other objects and advantages of the present disclosure will be more apparent from the following description when read in conjunction with the accompanying figures, which are not intended to limit the scope of the present disclosure.

SUMMARY

In accordance with the present disclosure there is provided a system for de-erection and re-erection of a blade of a wind turbine. The system includes:
  at least one first pulley mounted at the bottom of the wind turbine;
  at least one second pulley mounted on at least one blade adjacent to the blade, the at least one second pulley positioned in line with the at least one first pulley;
  at least one third pulley, the at least one third pulley forming a Gun Tackle arrangement with the at least one second pulley;
  a receptacle disposed over a substantial length of the blade;
  a lifting line passing over the at least one first pulley, the at least one second pulley, the at least one third pulley and attached back to the at least one second pulley;
  at least one load bearing mechanism configured for pulling and releasing of the lifting line to enable vertical motion of the receptacle disposed over the blade;
  a load supporting mechanism connected to an operative bottom portion of the blade and configured to support the blade during de-erection and re-erection thereof; and at least one holding mechanism attached to the at least one third pulley, the at least one holding mechanism adapted to hold the receptacle.

Typically, the system further includes a jig mounted at the bottom of tower of the wind turbine, the jig adapted to mount the at least one first pulley. Additionally, the system further includes of a sky lift adapted to carry at least one individual to a substantial height of the wind turbine. Also, the at least one first pulley is a one-way pulley. Additionally, the at least one second pulley is a two-way pulley. Also, the at least one third pulley is a one-way pulley. Typically, the at least one load supporting mechanism and at least one load bearing mechanism is chosen from a group consisting of a crane, manual force and at least one winch. Additionally, the at least one lifting line is selected from the group consisting of rope, chain and belt. Also, the receptacle is a polyester basket. Typically, the holding mechanism is a hook.

In accordance with the present disclosure there is provided a method for de-erection of a blade of a wind turbine comprising the following steps:
- positioning the blade being removed in a six o'clock position;
- locking the blade in the six o'clock position;
- assembling a jig at the bottom of the wind turbine;
- mounting at least one first pulley on the jig;
- mounting at least one second pulley on blades adjacent to the blade;
- mounting at least one third pulley forming a Gun Tackle arrangement with said at least one second pulley;
- attaching receptacle over a substantial length of the blade;
- attaching at least one lifting line from a load bearing mechanism over the at least one first pulley, the at least one second pulley, the at least one third pulley back to the at least one second pulley;
- attaching the third pulley with a holding mechanism to the receptacle;
- attaching a load supporting mechanism to an operative bottom portion of the blade; and
- lowering the blade by operating the lifting line.

Typically, the step of attaching a receptacle over a blade of a wind turbine comprising:
- lifting a sky lift to a substantial height of the blade being removed;
- pulling the lifting line with the use of the load supporting mechanism;
- guiding the receptacle over the blade to be removed; and
- tightening straps of the receptacle.

In accordance with the present disclosure there is provided a method for re-erection of a blade of a wind turbine comprising the following steps:
- positioning a mounting face of hub for the blade being installed in six o'clock position;
- locating the blade in line with the hub location;
- attaching a receptacle over at least a portion of the blade;
- attaching the third pulley to the receptacle with a holding mechanism;
- attaching a load supporting mechanism to an operative bottom portion of the blade;
- attaching the lifting line to a load bearing mechanism;
- operating the load bearing mechanism to lift the receptacle carrying the blade; and
- installing the blade inside the hub.

Typically, the step of installing the blade inside the hub is succeeded by steps comprising:
- lifting a sky lift to allow at least one individual within to loosen the straps of the receptacle once the blade is re-erected in the hub;
- releasing the lifting line from the load bearing mechanism to lower the receptacle.

BRIEF DESCRIPTION OF ACCOMPANYING DRAWINGS

A system and method for de-erection and re-erection of a blade of a wind turbine of the present disclosure will now be described with the help of the accompanying drawings, in which.

DETAILED DESCRIPTION OF THE ACCOMPANYING DRAWINGS

A preferred embodiment of a system and method for de-erection and re-erection of a blade of a wind turbine of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The disadvantages associated with the conventional system of de-erecting and re-erecting a blade of a wind turbine, are primarily attributed to the use of a crane in the process. It is difficult to use a crane when wind turbines are installed on inaccessible terrains. Cranes also consume a considerable amount of fuel hence adding to the operation cost of the conventional system. Further, cranes impose limitations on the operational height of the de-erection and re-erection tasks. Some of the key objectives of the proposed system are to limit the use of cranes and easy mobilization of the resources required for de-erecting and re-erecting the blade of a wind turbine.

Figure 1:
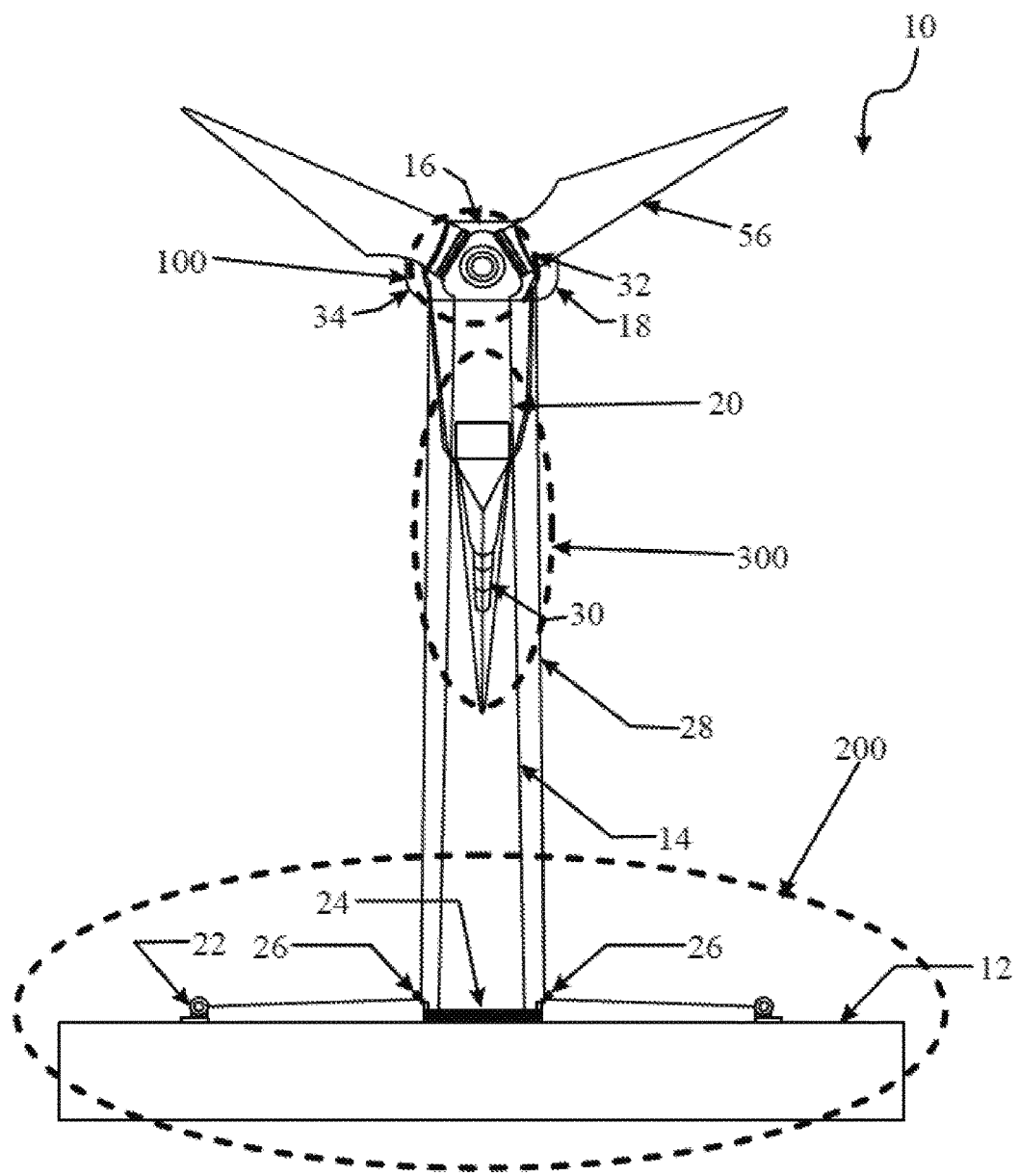
FIG. 1 illustrates a front view of the system for de-erection and re-erection of a blade of a wind turbine in accordance with an embodiment of the present disclosure.
Figure 2A:
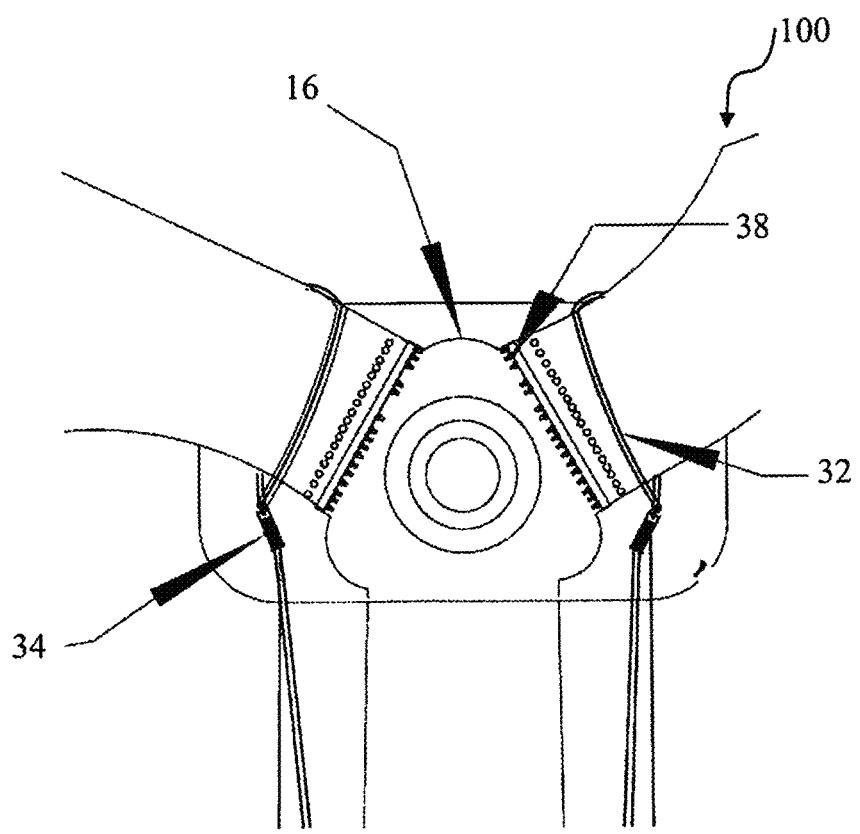
FIG. 2a illustrates the front view of a hub of the system of FIG. 1.
Figure 2B:
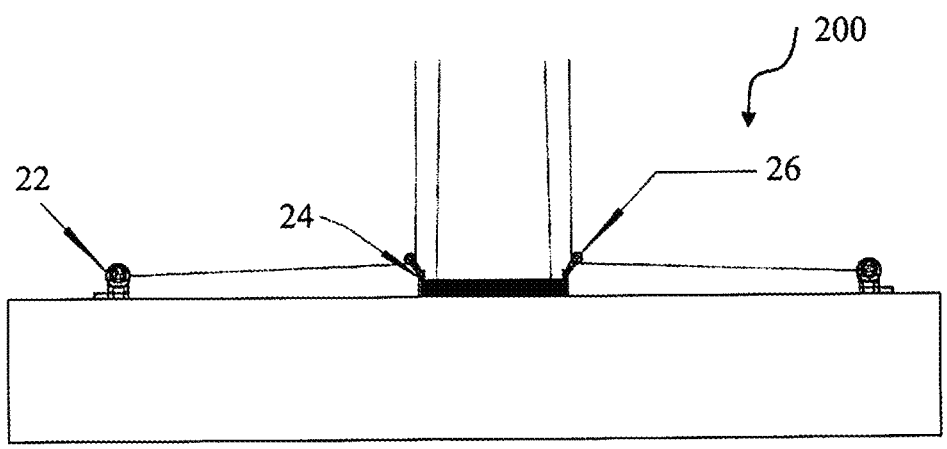
FIG. 2b illustrates the front view of a ground winch, a tower bottom jig and a first pulley of the system of FIG. 1.

Referring to the accompanying figures, the system showing the front view of de-erecting and re-erecting of a wind turbine illustrated in FIG. 1 is generally represented with the reference numeral 10. The illustration in FIG. 1 is divided into three main sub-structures. They are the nacelle and the hub arrangement, ground operations and the wind turbine blade arrangement. These sub-structures are represented with the reference numeral 100, 200 and 300 respectively. These sub-structures are represented in the FIGS. 2a, 2b and 2c respectively. FIG. 3 illustrates the isometric view of the operation conducted to de-erect and re-erect the wind turbine blade 20.

The inflow of the wind strikes the wind turbine blades 20 and 56, which in turn activates the rotor (not shown). The rotor and the wind turbine blades 20 spin the main shaft (not shown) which in turn activates the generator (not shown) via an optional intermediate gear (not shown). The wind turbine blades 20 and 56 are subjected to constant failure and damages, thereby requiring regular maintenance. The inner elements of the hub 16 and the nacelle 18 which include the slewing ring bearing 38 also require constant maintenance, which requires the removal of the wind turbine blade 20. The system 10 uses portable resources which when attached to the wind turbine offers the necessary contraption, utilizing the strength of the wind turbine structure to de-erect and re-erect the wind turbine blade 20.

The resources needed for de-erecting and re-erecting the wind turbine blade 20 are at least one load bearing mechanism 22, at least one first pulley 26, at least one second pulley 34, at least one third pulley 58, optionally at least one fourth pulley (not shown), a tower bottom jig 24, at least one lifting line 28, at least one receptacle 30, at least one load supporting mechanism 48 for supporting the wind turbine blade 20 and at least one holding mechanism (not shown) to attach the third pulley 58 to the receptacle 30.

The main objective of the holding mechanism is to attach the at least one third pulley 58 to the receptacle 30. The at least one second pulley 34 and at least one third pulley 58 form a Gun Tackle configuration. The at least one third pulley 58 contains the holding mechanism. The holding mechanism is preferably a hook (not shown).

The nacelle 18 of the wind turbine contains a winch (not shown). The nacelle winch lifting line (not shown) from the winch is used to lift the different tools required to conduct the operation of the turbine blade 20 de-erection and re-erection. The nacelle 18 also contains at least one drum (not shown) with a supporting line (not shown) wound around it. The supporting line wound around the drum is preferably a rope. In one embodiment, the nacelle 18 contains two such drums, whose ropes are connected with a U-Clamp (not shown). The ropes are used to support a sky lift. The sky lift is used to carry operators who help in guiding the receptacle 30 over the wind turbine blade 20.

The load bearing mechanism 22 is selected from a group consisting of a winch, manual force and a crane. In a preferred embodiment, the winch is used as a load bearing mechanism as it can be easily transported and has a large power to size ratio. The four main factors that affect the selection of the winch are the winch rating, load pulling vs lifting, power and duty cycle.

Some other factors that affect the winch selection with reference to its application for de-erecting and re-erecting wind turbine blade 20 are line speed, solenoid type, motor type and its use in rugged outdoor terrains.

The system 10 consists of at least three pulleys. The first pulley 26 is a one-way pulley, the second pulley 34 is a two-way pulley and the third pulley 58 is a one way pulley. Some of the factors that affect the selection of the pulleys 26, 34 and 58 are the capacity to handle and the power to be transmitted.

The system 10 further comprises of at least one lifting line 28. The lifting line 28 includes but not restricted to rope, belt and chain. The lifting line 28 is of material which includes but not restricted to steel, nylon, polypropylene, polyester and natural fibers, but preferably steel.

The tower bottom jig 24 is a ring like structure, which according to one embodiment is circular in shape attached to the bottom of the wind turbine tower 14. The tower bottom jig 24 includes the means to mount the first pulley 26 thereon. In one embodiment, the tower bottom jig 24 is made of standard steel. Typically, the tower bottom jig 24 is designed depending on various factors such as the tower 14 bottom circumference, the load to be balanced by the pulley 26 attached to the tower bottom jig 24 and the convenience of attaching and releasing the tower bottom jig 24 from the bottom of the tower 14. In one embodiment, the tower bottom jig 24 is clamped around the tower 14 bottom and fastened with the use of bolts and pins (not shown). The pulley 26 carries the lifting line 28 from the load bearing mechanism 22 installed on the ground. The second pulley 34 is mounted on the root side of at least one wind turbine blade 56, adjacent to the wind turbine blade 20. As illustrated in the FIG. 2a, according to one embodiment, two second pulleys 34 are mounted on the two wind turbine blades 56 adjacent to the blade 20 being removed.

The system 10 further includes a receptacle 30 constructed of at least one of a belt and rope depending on design factors such as weight of the blade 20 and the surface curvature of the blade 20. The receptacle 30 further has provisions to get attached to the third pulley 58 with the assistance of a holding mechanism. In one embodiment, the receptacle 30 is a polyester basket. The advantage of using polyester is its high load carrying capacity, low shrinkage and its ability to hold its shape. According to one embodiment, the receptacle 30 is designed to carry 7 times the weight of the wind turbine blade 20.

Figure 2C:
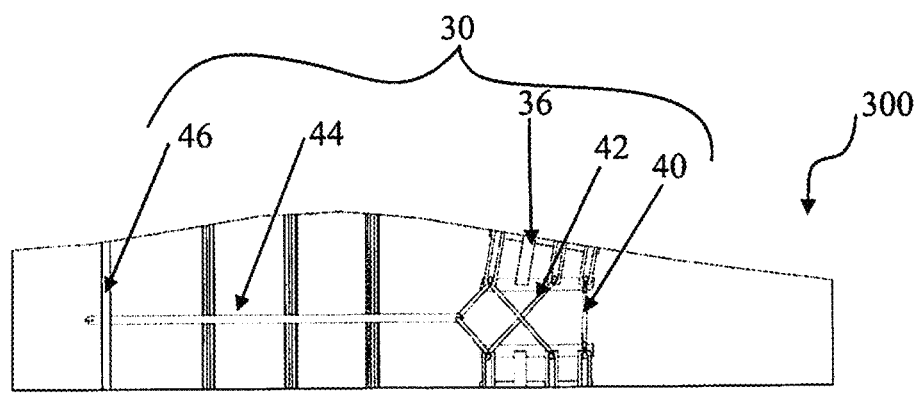
FIG. 2c illustrates a side view of a receptacle of the system of FIG. 1.
Figure 3:
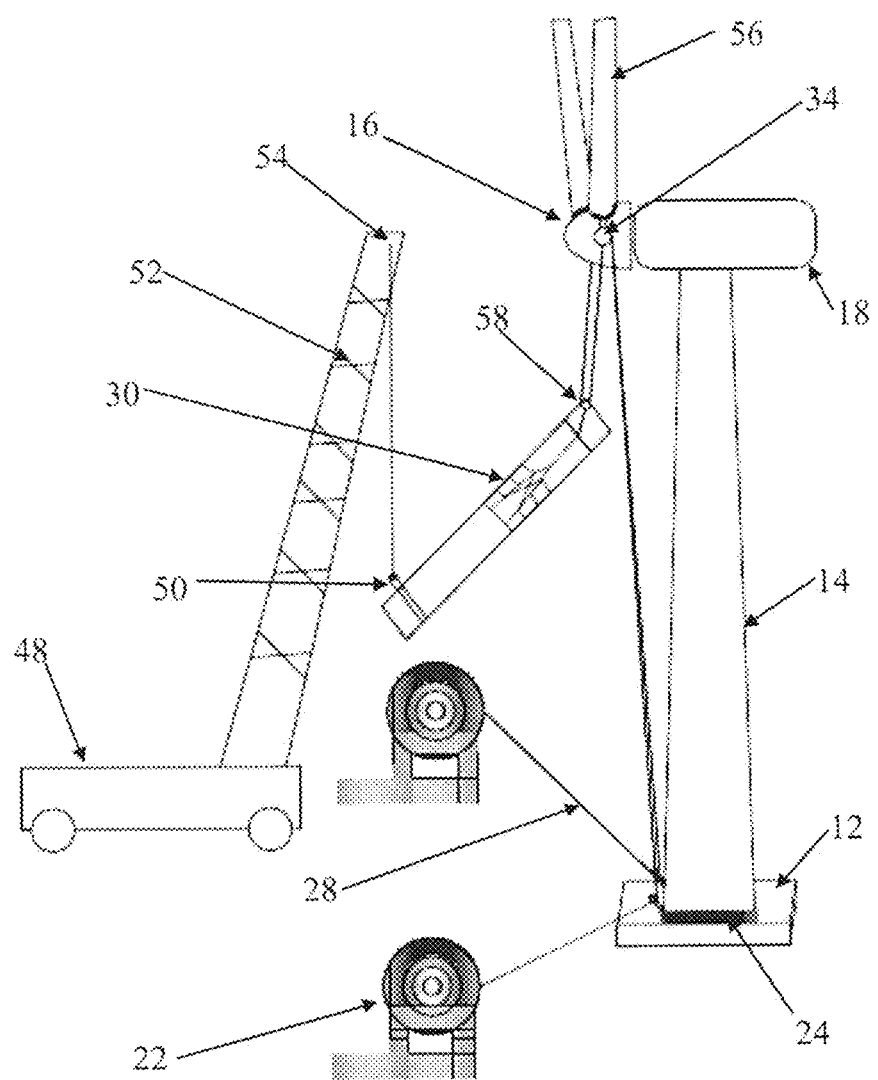
FIG. 3 illustrates an isometric view of the system of FIG. 1.

As illustrated in FIG. 2c the receptacle 30 includes a primary strap 46 which leads the entire receptacle 30 onto the wind turbine blade 20. Further, the receptacle 30 includes a main lifting belt 44 positioned orthogonal to the primary strap 46. A receptacle sock 36 is attached to the main lifting belt 44. The receptacle sock 36 further includes round slings 42 which adjust itself as per the tension imposed by the receptacle sock 36 as it slides on to the surface of the wind turbine blade 20. One end of the receptacle sock 36 is held together by an end lock belt 40. Another strap which does not directly form part of the receptacle 30 is the secondary strap 50 (as illustrated in FIG. 3). The primary strap 46, the main lifting belt 44 and the round slings 42 attached together avoid the sliding and falling of the wind turbine blade 20 during the process of de-erecting or re-erecting the wind turbine blade 20. The secondary strap 50 has a provision of holding onto the rigging equipment (not shown) of a load supporting mechanism 48. The provision of holding onto the attachment element enables steady and damage free lowering and lifting of the wind turbine blade 20.

According to one embodiment, the system 10 further consists of a sky lift (not shown). The function of the sky lift is to hoist at least one operator to a desired height. The sky lift, attached with the supporting line (not shown) moves vertically to allow the operator within to guide the receptacle 30 on to the wind turbine blade 20. The operator also tightens the straps of the receptacle 30 over the surface of the blade 20.

According to one embodiment, the system 10 further includes a web belt 32. The web belt 32 includes but not restricted to belt, chain and rope. According to one embodiment the web belt 32 is of polyester. The primary function of the web belt 32 is to support the at least one second pulley 34.

Typically, the load supporting mechanism 48 is a crane (as shown in FIG. 3), however a manual force and a winch based support may also be used. The main elements of the load supporting mechanism 48 are boom/jib 52, at least one jib pulley 54 and at least one hook (not shown) attached to the secondary strap 50.

The operation of de-erecting the wind turbine blade 20 begins with ensuing different safety considerations. An appropriate location is identified in order to install the load bearing mechanism 22. In one embodiment, load bearing mechanism 22 includes two electric winches installed at suitable positions and at equal distances from the center axis of the wind turbine. Typically, the installation is done by driving at least one peg (not shown) through a platform into the ground 12. Further, counter weights are also provided to the load bearing mechanism 22. The material for the counter weights is at least one of concrete and metal. The key purpose of the pegs and the counter weight is to avoid slip and sliding of the load bearing mechanism 22 during operation. According to one embodiment, the installation also includes two rope guide stands for supporting tag lines (not shown).

In one embodiment, the turbine is yawed and the wind turbine blade 20 to be removed is brought to a 6 o'clock position. In one embodiment the rotation of the wind turbine blade 20 to the 6 o'clock position is done manually, however, it may be done with the assistance of external tools or by the force of the wind.

Once the wind turbine blade 20 to be removed assumes the 6 o'clock position, at least one lock (not shown) is applied on the hub 16 to avoid any further rotation. In one embodiment, the lock is of brake disc type. The locking is at least of a mechanical/hydraulic type. The crew in the nacelle 18 attaches the supporting line around the main shaft (not shown) of the wind turbine. The sky lift is attached to the supporting line. This is followed with the torque release. In one embodiment, the torque release is conducted for about 50% of the blade bolts (not shown) in an alternate manner. This is followed by the release of the clamp (not shown) of type chosen from a group consisting of hydraulic, electric and mechanical.

The team on the ground assembles the tower bottom jig 24. The bolts and pins (not shown) are fastened either manually, hydraulically or pneumatically.

The team on the ground then unloads the receptacle 30. The crew at the nacelle 18 lifts at least one second pulley 34. In one embodiment, two second pulleys 34 are lifted. Once the second pulley 34 reaches the hub 16, the crew at the nacelle 18 attaches the web belt 32 along the circumference of the adjacent wind turbine blades 56. According to one embodiment, the load supporting mechanism 48 is used to pull the lifting line 28 from the first pulley 26 installed on the tower bottom jig 24. The other end of the lifting line 28 passing over the first pulley 26, second pulley 34 and the third pulley 58 and is attached back to the second pulley 58. The third pulley 58 is attached to the receptacle 30 with the assistance of a holding mechanism. As the load supporting mechanism 48 pulls the lifting line 28, the receptacle 30 gets lifted. The wind turbine blade 20 enters the receptacle 30. In one embodiment, the operator in the sky lift guides the wind turbine blade 20 into the receptacle 30.

In accordance with an embodiment of the present disclosure, once the receptacle 30 is firmly attached to the wind turbine blade 20, the crew continues to use the same web belt 32 carrying the at least one second pulley 34. In another embodiment, the crew at the nacelle removes the web belt 32 from the adjacent blade 56 and replaces it with another web belt (not shown) carrying at least one fourth pulley with a higher load bearing capacity.

According to one embodiment the connection of the holding mechanism and the third pulley 58 is that of bolt shackle. Once all the connections and the joints are cross checked, the remaining bolts holding the wind turbine blade 20 to the hub 16 are released. The operation of the load bearing mechanism 22 releases the blade 20 with a downward descent hence de-erecting the wind turbine blade 20. According to one embodiment, the lifting line 28 is a rope and load supporting mechanism 48 is a crane.

Once, the released wind turbine blade 20 reaches a height from where the load supporting mechanism 48 can operate, a rope passing over the jib pulley 54 attached at the top of the tower 52 of the load supporting mechanism 48, is connected with the secondary strap 50 guided on the wind turbine blade 20 as illustrated in FIG. 3. The lower the wind turbine blade 20 descends, the further the tower 52 moves from the wind turbine. This changes the orientation of the wind turbine blade 20 from vertical to horizontal. Once the wind turbine blade 20 is positioned parallel to the surface of the ground, all the hooks and attachments are released.

In order to re-erect the wind turbine blade 20, the process, as mentioned above, is reversed. The load supporting mechanism 48 is re-connected to the secondary strap 50. At least one load bearing mechanism 22 installed on the ground pulls on the lifting line 28. This causes the wind turbine blade 20 to change orientation from a horizontal position to a vertical position and the connections enter the hub 16. The team in the nacelle 18 re-connects all the bolts and fittings which were taken apart while de-erecting the wind turbine blade 20.

TECHNICAL ADVANCEMENTS

The technical advancements offered by the present disclosure include the realization of:

- a system and method for de-erection and re-erection of a blade of a wind turbine which works for KW to MW class wind turbines;
- a system and method for de-erection and re-erection of a blade of a wind turbine which effectively minimizes the use of a crane;
- a system and method for de-erection and re-erection of a blade of a wind turbine which can perform the operation at greater heights;
- a system and method for de-erection and re-erection of a blade of a wind turbine which is portable;
- a system and method for de-erection and re-erection of a blade of a wind turbine which is cost effective; and
- a system and method for de-erection and re-erection of a blade of a wind turbine which can be used on different terrains.
- a system and method for de-erection and re-erection of a blade of a wind turbine which is time effective.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A system for de-erection and re-erection of a first blade of a wind turbine, said wind turbine having a top side comprising a plurality of blades and a bottom side comprising a tower on which the plurality of blades are mounted, said system comprising:
   - a jig in the form of a ring-like structure configured to be releasably attached to and clamped around the bottom of said tower, wherein the jig is made of steel;
   - a first pulley configured to be mounted on said jig;
   - a second pulley configured to be attached at a root side of one blade of the plurality of blades adjacent to said first blade, said second pulley positioned in line with said first pulley;
   - a receptacle comprising a primary strap configured to dispose said receptacle over said first blade;
   - a third pulley configured to be attached to said receptacle and form a gun tackle arrangement with said second pulley;
   - a lifting line passing over said first pulley, said second pulley, said third pulley and attached back to said second pulley;
   - at least one load bearing mechanism configured for pulling and releasing of said lifting line to enable vertical motion of said receptacle disposed over said first blade;
   - a load supporting mechanism connected to an operative bottom portion of said first blade and configured to support said first blade during de-erection and re-erection thereof; and
   - at least one holding mechanism attached to said third pulley, said at least one holding mechanism adapted to hold said receptacle.

2. The system as claimed in claim 1 further comprising a sky lift adapted to carry at least one individual to a height of said wind turbine.

3. The system as claimed in claim 1, wherein said first pulley is a one-way pulley.

4. The system as claimed in claim 1, wherein said second pulley is a two-way pulley.

5. The system as claimed in claim 1, wherein said third pulley is a one-way pulley.

6. The system as claimed in claim 1, wherein said at least one load bearing mechanism is chosen from the group consisting of a crane, manual force and at least one winch.

7. The system as claimed in claim 1, wherein said lifting line is selected from the group consisting of a rope, chain and belt.

8. The system as claimed in claim 1, wherein said receptacle is a polyester basket.

9. The system as claimed in claim 1, wherein said holding mechanism is a hook.

10. The system as claimed in claim 1, wherein said at least one load supporting mechanism comprises a crane.

11. The system as claimed in claim 1, wherein said ring like structure of said jig is configured to match the circumference of the bottom of the tower to facilitate attachment and release of said jig.

* * * * *